United States Patent [19]

Lechervy et al.

[11] Patent Number: 5,383,593
[45] Date of Patent: Jan. 24, 1995

[54] METHOD FOR WELD-ASSEMBLING A DISK FITTED WITH SMALL WINGS BY AN ENERGY BEAM

[75] Inventors: Pierre M. S. Lechervy, Ste. Genevieve Des Bois; Bernard P. C. Sohier, Savigny Le Temple, both of France

[73] Assignee: Societe Nationale d'Etude et de Construction de Moteurs d'Aviation "SNECMA", Paris, France

[21] Appl. No.: 145,182

[22] Filed: Nov. 3, 1993

[30] Foreign Application Priority Data

Nov. 4, 1992 [FR] France ................. 92 13169

[51] Int. Cl.6 ................. B23K 31/02; B23K 9/02
[52] U.S. Cl. ................. 228/182; 228/214; 228/59; 219/121.14; 29/889.21
[58] Field of Search ........... 29/889.21; 228/182, 228/214, 59; 219/121.14

[56] References Cited

U.S. PATENT DOCUMENTS

| | | | |
|---|---|---|---|
| 3,609,841 | 10/1971 | Telfer et al. | 29/889.21 |
| 4,736,504 | 4/1988 | Jones | 228/160 |
| 4,796,343 | 1/1989 | Wing | 29/889.21 |
| 4,864,706 | 9/1989 | Jenkel | 29/889.21 |

FOREIGN PATENT DOCUMENTS

| | | |
|---|---|---|
| 2390242 | 12/1978 | France . |
| 2673558 | 9/1992 | France . |
| 2130127 | 12/1972 | Germany . |
| 2109274A | 6/1983 | United Kingdom ............ 29/889.21 |

OTHER PUBLICATIONS

Database WPI Wk 8505, Jun. 15, 1984, Derwent Publ. Ltd., London GB; AN 85-029999.
Database WPI Sect. Ch, Wk 9301, Feb. 15, 1992. Derwent Publ. Ltd., London; AN 93-007300.

*Primary Examiner*—Kurt Rowan
*Assistant Examiner*—Jeffrey T. Knapp
*Attorney, Agent, or Firm*—Oblon, Spivak, McClelland, Maier & Neustadt

[57] ABSTRACT

Method is for assembling a disk fitted with small wings. The small wings are composed of a foot made of an element with the disk and welded blades. The disk and the blades are installed on a rotating template with fixing means in the desired position and elements are merged at the joining surface by an electron gun or similar device. The small wings are successively welded during one or two operations. Screens for halting heating radiation are situated behind the wings to be welded. Rotors of turbines and compressors may be assembled in this manner.

9 Claims, 5 Drawing Sheets

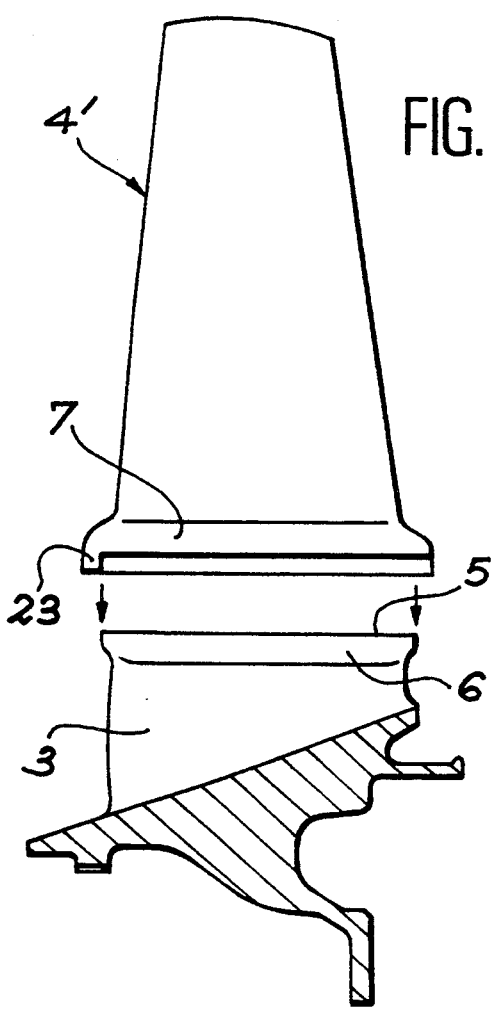
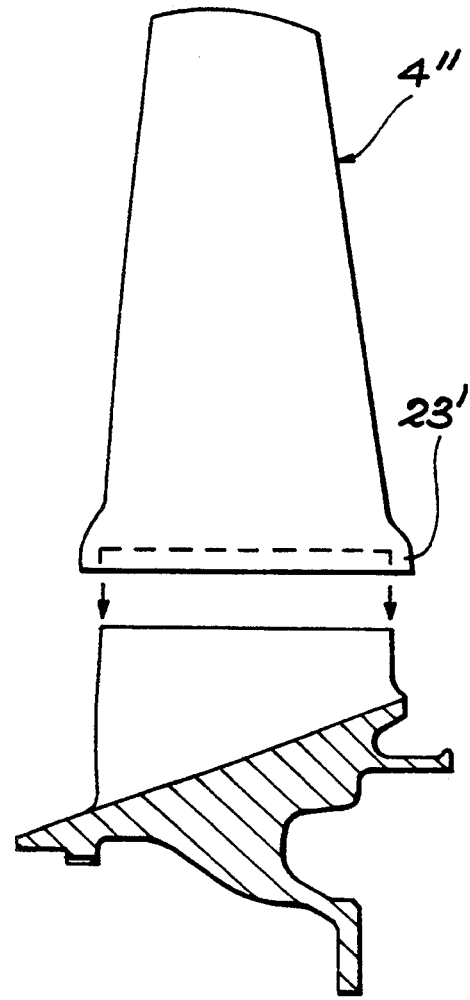
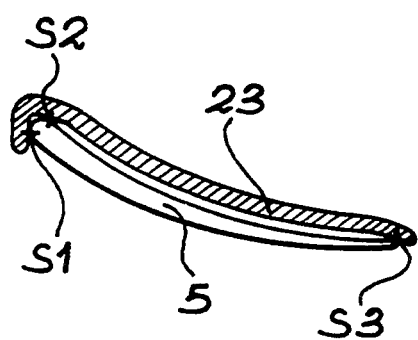
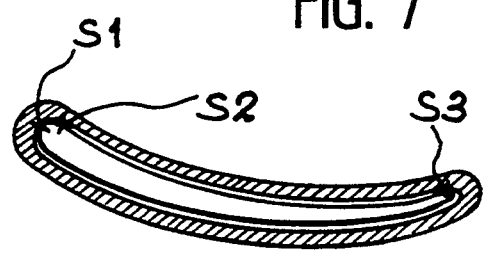

METHOD FOR WELD-ASSEMBLING A DISK FITTED WITH SMALL WINGS BY AN ENERGY BEAM

FIELD OF THE INVENTION

The invention concerns a method for weld-assembling a disk fitted with small wings by means of a beam of energy.

BACKGROUND OF THE INVENTION

A large number of turbine and compressor type machines possess vane stages constituted by disks on which the small wings are weld-assembled. However, this method is difficult to control correctly owing to the large number of small wings requiring extreme precision and delicate assembling and welding operations still able to be compromised by the deformations occuring via heating on welding.

SUMMARY OF THE INVENTION

The method of the invention is able to avoid these drawbacks by quickly and easily embodying the assembling of the small wings on the disk, whether this concerns all the wings on production of the disk or several of them solely during repair of the latter.

In fact, the wings are composed of a foot and a blade. The feet are short sections of an element with the disk and are produced with the latter. The blades constitute the main elements of the wings and are forged separately before being welded to the feet. The methods consists of installing the disk and the blades on a rotating template fitted with means for fixing the disk and the blades, the blades touching the feet at joining surfaces, of rotating the template so as to successively place the blades in front of an energy beam which traverses the joining surfaces and weld the blades to the feet so as to assemble the wings. Screens are then installed between the blades to be assembled and other blades so as to intercept the beam after it has traversed the respective joining surfaces. All these steps make it possible to firmly and accurately keep the blades in place and weld them separately without risking the beam touching the neighbouring portions of the assembly, damage them or produce expansions or deformations.

If all the blades need to be assembled, a particular application of the method consists of installing the screens in a first half of the gaps between the blades, a second half of the gaps being empty, and of having the beam pass through the gaps of the second half so as to assemble a first half of the blades and of then removing the screens and instal them in the second half of the gaps and of having the beam pass through the gaps of the first half so as to assemble the second half of the blades.

The fixing means may include punctual surfaces on which the blades are supported by locations opposite the junction points, that is at the end of the small wings. They may also include squares on which three pairs of faces of feet and blades close to the junction points are supported. A different solution consists of using sleeves which surround, at least partially, one portion of the feet and one portion of the blades close to the junction points, three pairs of sleeve faces being supported on three faces of each of said portions. The sleeves may belong to either the feet or the blades.

Another solution having the approximately same value consists of connecting the blades to the feet by centering slugs.

BRIEF DESCRIPTION OF THE DRAWINGS

The invention shall now be described in more detail with the aid of the non-restrictive embodiments shown on the figures, namely:

FIGS. 4 and 5, 6 and 7, 8 and 9, and 10 and 11 represent four other mounting modes at the junction point of a foot and a blade.

DETAILED DESCRIPTION OF THE PREFERRED EMBODIMENTS

Figure 1:
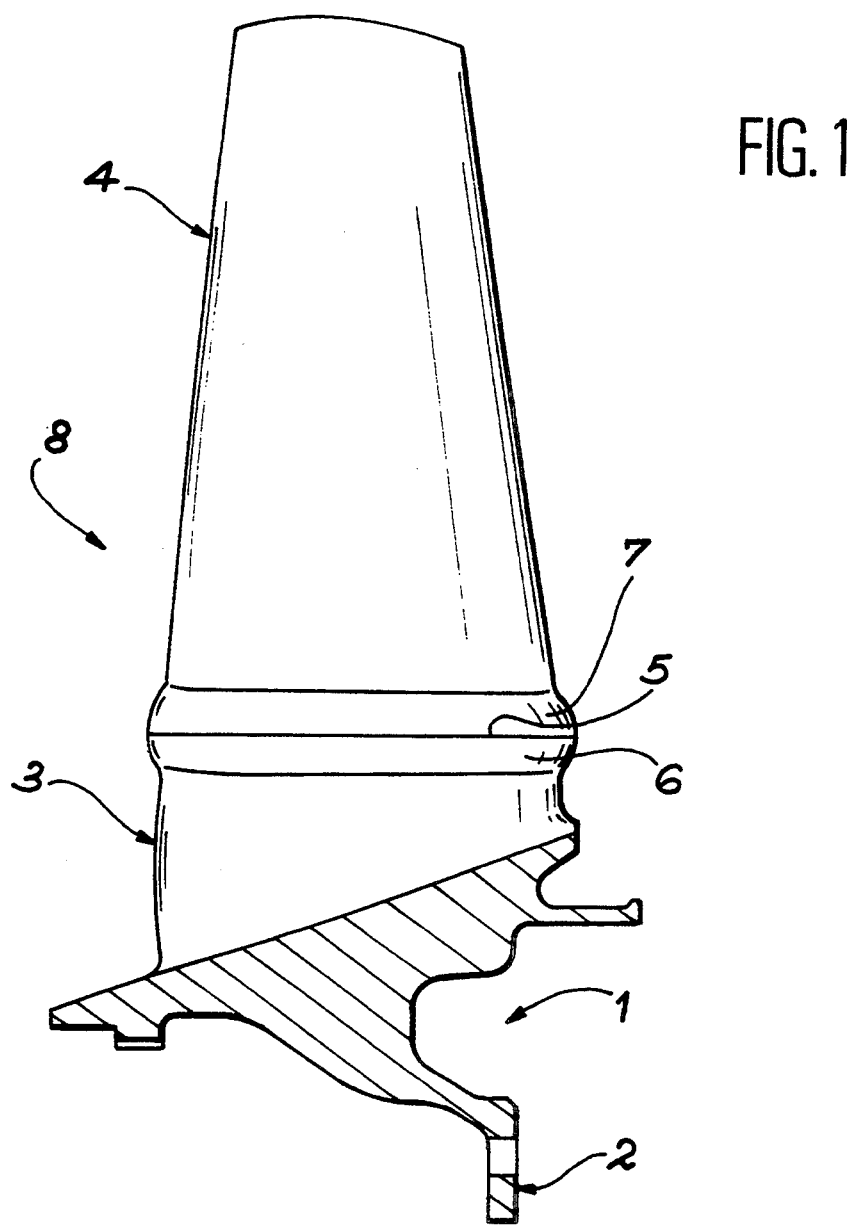
FIG. 1 shows a blade laid on its foot.

FIG. 1 shows a longitudinal half-section of a rotor disk 1 intended to be assembled with other elements of the rotor and accordingly provided with means, such as a flange 2 situated on its internal face. The disk 1 is produced by known methods with wing feet 3 distributed on its periphery and on which the wing blades 4 are to be fixed, the dimensions, width and particular shape, generally twisted, requiring that said wing blades be produced separately by methods other than that for the disk 1 and of then assembling them with the latter.

The assembling is effected by a preferably flat joining surface 5 touching the accurately machined faces of the foot 3 and the blade 4. The foot 3 and the blade 4 are each provided at this location with a small ring, respectively 6 and 7, whose functions are to increase the joining surface 5 and constitute a larger section and larger wing cord whose machining shall then make it possible to eliminate any superficial welding defects, as well as the excess lengths required for starting and stopping welding. The wing is given the reference 8.

Figure 2:
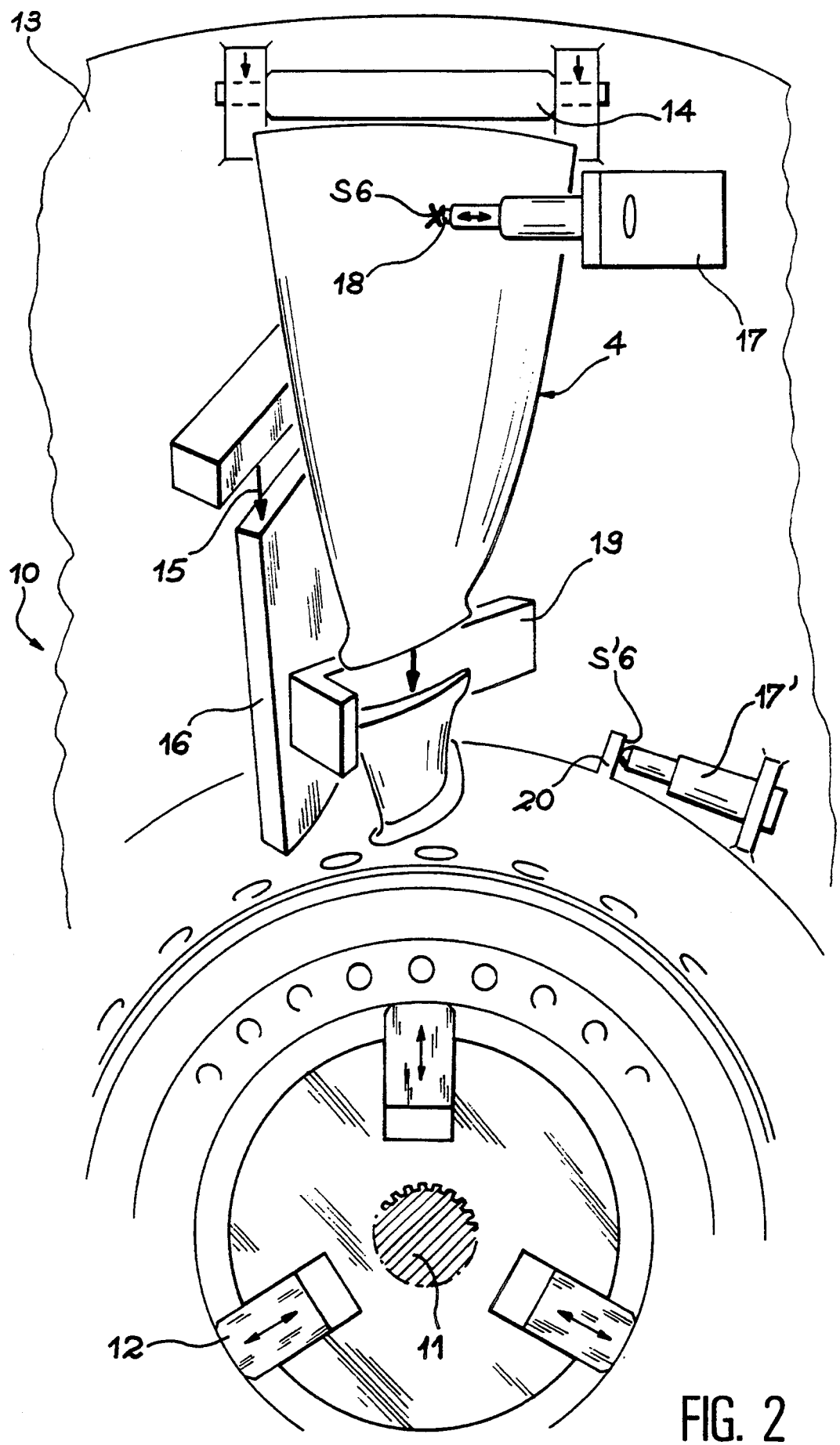
FIG. 2 shows the assembling template.

FIG. 2 shows how the disk 1 and the blades 4 are mounted on the template 10 in their mutual assembling position. The template 10 includes a spindle 11 rotating with angles of a specific value under the action of an angular positioning device (not shown). The spindle 11 drives jaws 12 for centering the disk 1 and the disk 1 itself. It also drives a frame 13 diagrammatically shown in the shape of a disk bearing movable squares 19 which touch the small rings 6 and 7, angular position marks 17 ended by stop hemispheres 18, blocks 14 which compress the blades 4 on the feet 3, and other blocks 15 which position movable screens 16 on the disk 1 between consecutive wings 8.

Figure 3:
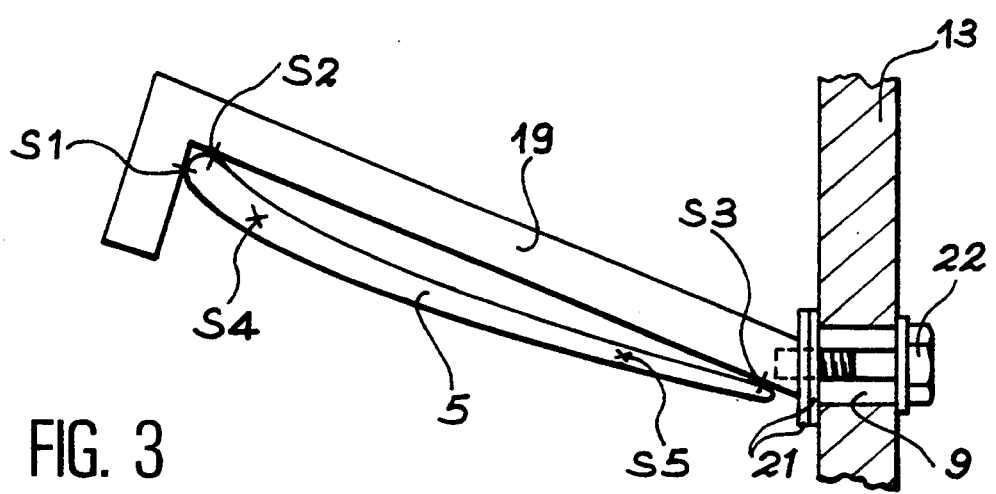
FIG. 3 shows the mounting mode at the junction point of a foot and a blade.

In this embodiment of the invention and as shown on FIG. 3, the small rings 6 and 7 each have three pairs of faces S1A, S2 and S3, the first pair being situated at one longitudinal extremity of the small rings 6 and 7 at the rounded edge of the wings 8, and for the others, at the two extremities of the small rings on the intrados side of the wings 8. These three pairs of faces S1 to S3 are machined with extreme accuracy; one side of the square 19 is supported on the pair of faces S1 and the other on the other two pairs S2 and S3. As the faces of the blade 4 and the foot 3 which meet are long, narrow and flattened by machining, they provide the equivalent of a support by two points or two other pairs of faces S4 and S5.

The exact placing of the blades 4 on the feet 3 and the disk 1 is ensured via the contact of a final face S6 at the extremity opposite the joining surface 5 on a respective stop hemisphere 18. Another angular position mark 17' is provided for the disk 1; it rests on a face S'6 of a catch 20 created to this effect on the disk 1. The mounting method may thus consist of placing the disk 1 around jaws 12 thus making it touch the angular position mark 17' at the face S'6, the squares 19 being secured to the frame 13 at a location which makes them touch the faces S1 to S3 (location able to be adjusted, for example, by shims 21 inserted between the squares 19 and the frame 13 and via the play of fixing screws 22 of the squares 19 in the perforations of the frame 13) and the blades 4 are then installed and immobilized with the aid of blocks 14. The squares 19 are then removed and the screens 16 are put into position with means of blocks 15.

An equivalent conception shown on FIGS. 4 and 5 consists of using blades 4' whose small ring 7 is completed by a lower edge 23 which partially surrounds the small ring 6 of the feet 3 at the approximative position of the squares 19 which are used in this instance. Three pairs of faces S1, S2 and S3 are used to help in accurately placing the blades 4', but in this instance they are not in support on an intermediate element: the faces S1, S2 and S3 of the blade 4' are situated on the lower face of the edge 23 and directly touch the faces S1, S2 and S3 with the same number of the foot 3. The edge may also be closed as shown in detail on FIGS. 6 and 7 where it is given the reference 23' on a blade 4". It then completely surrounds the end of the foot 3 with a play enabling it to only touch it at the pairs of faces S1, S2 and S3. These edges 23' forming sleeves could also belong to the feet 3 with the same effect. It ought to be mentioned that the element not bearing the sleeve may be provided without the small ring 6 or 7 and assembled fully with approximately its final dimensions prior to assembling.

Figure 8:
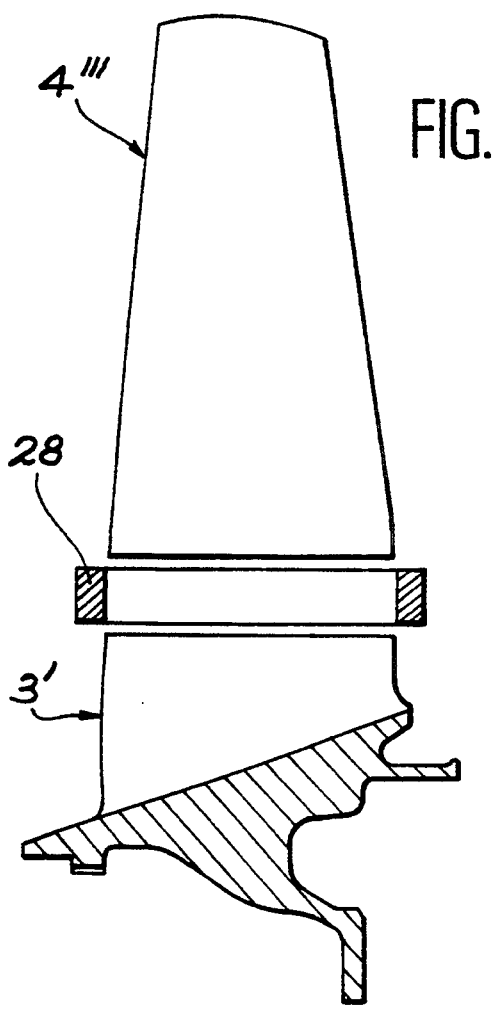
Figure 9:
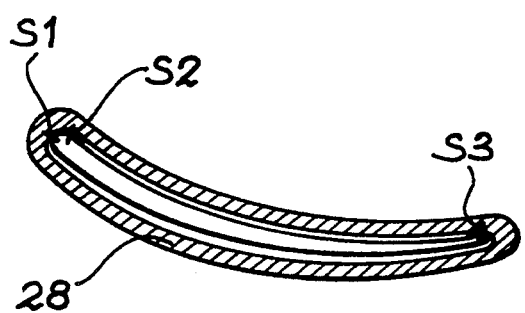

Another similar conception shown on FIGS. 8 and 9 consists of assembling the foot (then given the reference 3') and the blade (then given the reference 4''') by means of an independent sleeve when the foot 3' and the blade 4''' each touch via the three faces S1, S2 and S3 disposed as previously. The sleeve 28 is combined with the blade 4''' via several welding points and a device of the same type. The small rings 6 and 7 are both omitted in this embodiment.

The conceptions respectively shown on FIGS. 6 and 7 and 8 and 9 are particularly adapted for repair as the foot 3' has its final dimensions immediately prior to assembling.

Figure 10:
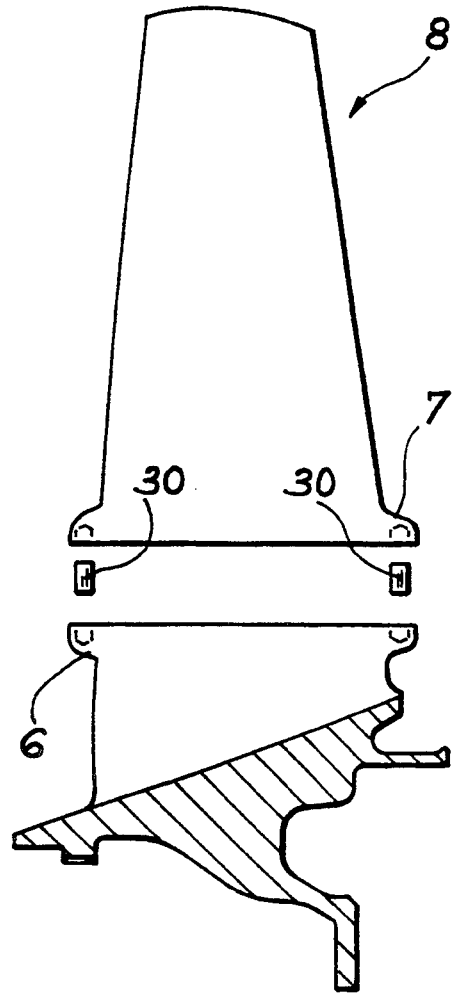
Figure 11:
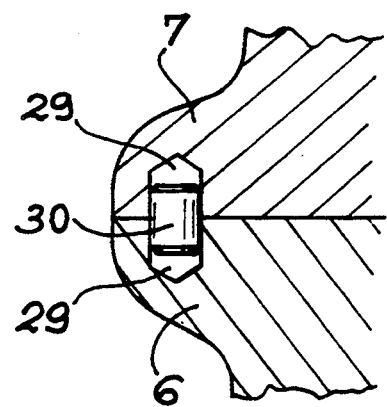

A final notion for combining the elements of the small wing 8 consists of using the feet 3 and blades 4 with the small rings 6 and 7, the latter being shown on FIGS. 10 and 11. The small rings 6 and 7 comprise perforations 29 for receiving at least two centering slugs 30.

For all the wing positioning conceptions described above, the assembling cycle comprises the following sequences:

a) positioning and immobilization of the disk 1 on the template 10,
b) positioning of all the wings 8 on the disk 1 by firstly making the respective pairs of faces S1, S2, S3, S4 and S5 of the joining surface 5 cooperate with one another, and secondly via the contact of the face S6 on the stop hemisphere 18,
c) immobilization of all the wings 8 to be assembled on the disk 1 by means of blocks 14 and removal of the squares when the latter are used,
d) placing of screens 16 with the aid of blocks 15,
e) successive weldings on the wings having a protection screen 16,
f) if appropriate for consecutive assemblings, repositioning the screens 16,
g) embodying welds on the wings having a screen 16.

Figure 12:
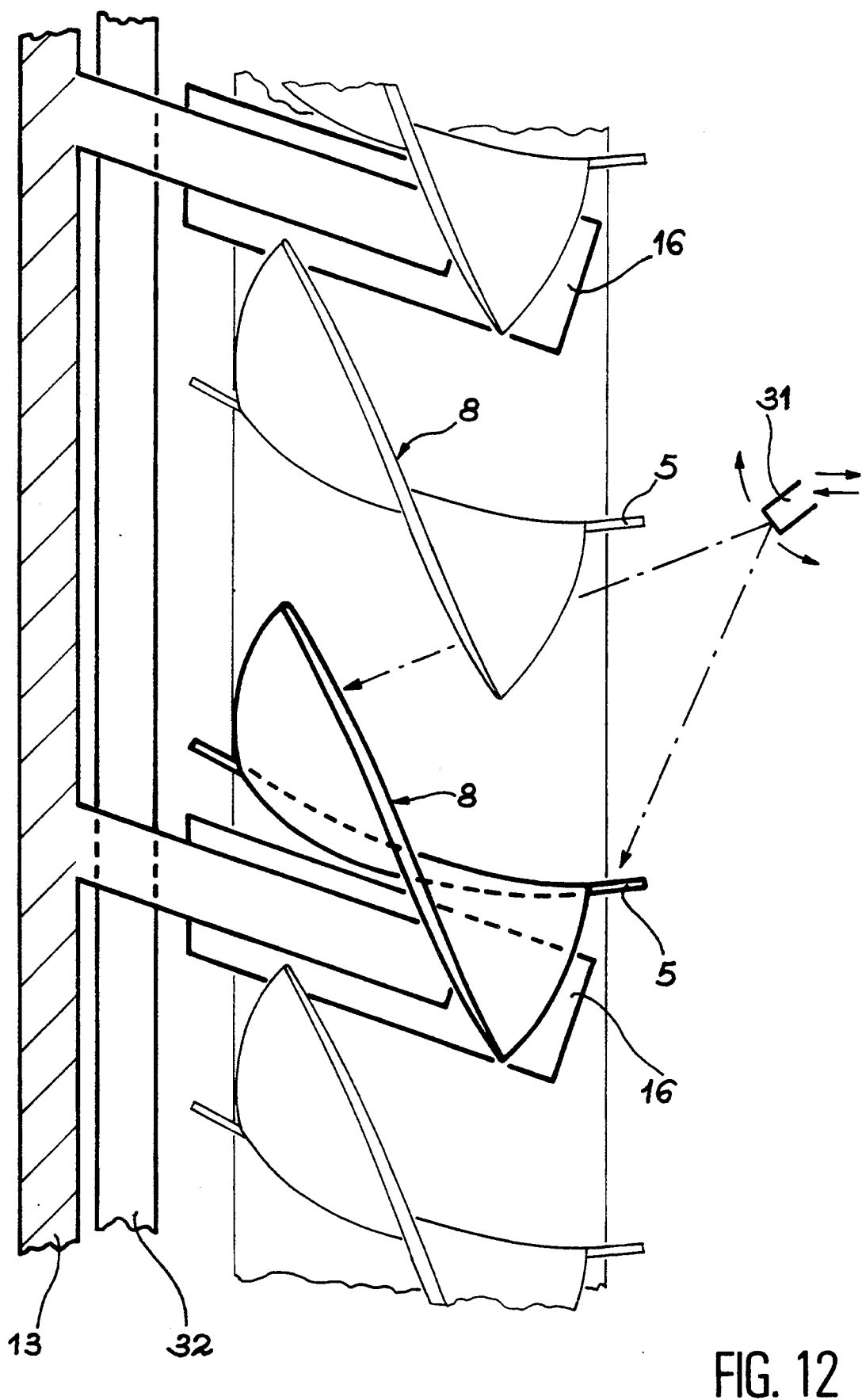
FIG. 12 illustrates the welding method of the invention.

FIG. 12 shows the characteristic assembling mode of the invention. An electron gun 31 is disposed in front of the template 10. The relative movement of the axis of the beam of electrons enabling the joining surface to be traversed of a wing 8 over its entire length is obtained, as the arrows suggest, either via a movement of rotation or via a translation movement or via a combination of these two movements. These movements are defined so that the radiation axis is as much as possible orientated in the direction of the thickness of the wing 8 and that the relative speed of movement of the beam is as constant as possible over the entire length of the joining point so as to optimize the welding operational conditions.

The blocks 14 ensure the contact of the blade 4 on the foot 3. A screen 16 situated behind the wing 8 absorbs the electrons which have traversed the wing 8 and thus prevents them from heating the adjacent wing 8. However, the gaps between the wings 8 are alternately occupied by a screen 16 or are empty. A circular screen 32 made of a material absorbing the energy of the particles is, like the screens 16, also provided between the wings 8 and the frame portion 13 situated immediately behind so that the latter is also protected from heating. The electron gun 31 is directed obliquely towards one of the sides of the disk 1 so that its radiation is as much as possible orientated in the direction of the thickness of the wing 8 and thus traverses it effectively but at no time reaches portions of the wing 8 situated immediately in front of the one which has been assembled.

When a wing has been completely welded, the spindle 11 and the frame 13 are rotated so as to place another wing 8 in front of the electron gun 31. The welding operation is repeated before moving to another wing 8 until half the wings 8 are welded, namely those situated in front of a screen 16. Then the screens 16 are removed so as to place them in the other gaps between the wings 8 through which the beam of electrons has passed. The second half of wings 8 may then be exposed to the beam of electrons and welded in the same conditions as indicated earlier. After the blades 4 have been mounted, the method is almost automatic, except for the sole stage for changing the position of the screens 16 which is, however, relatively quick. In particular, it is clear that the regularity of the structure is accomodated with an energy beam whose scanning movement is adjusted once only for all and with identical rotations of the spindle 11. The total period of assembling is only several hours for a complete disk. It is then possible to machine the wings 8 at the joining surfaces 5. Extreme security of execution characterizes the method as any misadjustments of the position of the blades 4 are virtually excluded and the localization of heating on the portions to be welded considerably limits any deformations likely to distort the shape of the disk.

The beam of electrons may be replaced by any other equivalent device able to provide the joining surfaces with sufficient energy.

What is claimed is:

1. Method for assembling by means of welding a disk provided with small wings composed of a foot integral with the disk and blades, wherein the method comprising the steps of installing the disk and blades on a rotating template fitted by means for fixing the disk and the blades, the blades touching the feet at joining surfaces, of rotating the template so as to place the wings successively in front of a beam of energy which traverses the joining surfaces and welding the blades to the feet, screens having been installed between the wings to be assembled and other wings so as to intercept the beam after the beam has traversed the joining surfaces.

2. Method for assembling a disk according to claim 1 and in which all the wings need to be assembled, wherein the method further comprises the steps of installing the screens in alternate gaps between the wings, thus creating a first set of gaps with screens between the wings and a second set of gaps without screens between the wings, and of making the beam pass through the gaps of the second set so as to assemble a first set of wings and then remove the screens and install them in the second set of gaps, and of making the beam pass through the gaps of the first set so as to assemble a second set of wings.

3. Method for assembling a disk according to claim 1, wherein the fixing means include punctual surfaces on which the blades are supported by faces situated on locations opposite the joining surfaces.

4. Method for assembling a disk according to claim 1, wherein the fixing means include squares on which three pairs of faces of feet and blades are situated close to the joining surfaces.

5. Method for assembling a disk according to claim 1, wherein the blades include edges which partially surround one portion of the feet close to the joining surfaces, three faces of the edges being supported on three faces of said portions.

6. Method for assembling a disk according to claim 1, wherein the blades include sleeves which surround one portion of the feet close to the joining surfaces, three faces of the sleeves being supported on three faces of said portions.

7. Method for assembling a disk according to claim 1, wherein the blades are connected to the feet by sleeves which surround two portions of feet and blades close to the joining surfaces, the sleeves being supported on three faces of each of said portions.

8. Method for assembling a disk according to claim 1, wherein the blades are connected to the feet by centering slugs.

9. Method for assembling a disk according to claim 1, wherein the beam is directed obliquely towards one of the sides of the disk.

* * * * *